(12) United States Patent
Bernal et al.

(10) Patent No.: US 11,912,346 B2
(45) Date of Patent: Feb. 27, 2024

(54) TRUCK HAVING A DYNAMICALLY ADJUSTABLE BOX

(71) Applicant: GM Global Technology Operations LLC, Detroit, MI (US)

(72) Inventors: Anthony Bernal, Farmington Hills, MI (US); Orlando Espana, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 319 days.

(21) Appl. No.: 17/385,176

(22) Filed: Jul. 26, 2021

(65) Prior Publication Data
US 2023/0024934 A1 Jan. 26, 2023

(51) Int. Cl.
*B62D 33/08* (2006.01)
*B62D 33/027* (2006.01)

(52) U.S. Cl.
CPC .......... *B62D 33/08* (2013.01); *B62D 33/027* (2013.01)

(58) Field of Classification Search
CPC .......... B62D 33/08; B62D 33/027; B60P 3/40
USPC ...................................... 296/26.09
See application file for complete search history.

(56) References Cited

U.S. PATENT DOCUMENTS

| | | | | |
|---|---|---|---|---|
| 5,649,731 A * | 7/1997 | Tognetti | ................. | B60P 1/003 296/57.1 |
| 5,658,033 A * | 8/1997 | Delaune | .................... | B60R 9/06 296/57.1 |
| 5,816,637 A * | 10/1998 | Adams | ..................... | B60P 3/40 296/57.1 |
| 7,347,474 B2 * | 3/2008 | Shagbazyan | ............. | B60J 7/026 293/118 |
| 8,534,735 B2 * | 9/2013 | McManus | .............. | B62D 31/00 296/26.08 |
| 9,783,245 B1 * | 10/2017 | Marchlewski | ....... | B62D 27/026 |
| 10,919,428 B2 * | 2/2021 | Wallace | .................. | B60R 5/041 |
| 11,059,423 B1 * | 7/2021 | Weaver | ................ | B62D 33/027 |

* cited by examiner

*Primary Examiner* — Joseph D. Pape
(74) *Attorney, Agent, or Firm* — CANTOR COLBURN LLP

(57) ABSTRACT

A vehicle includes a chassis, a passenger compartment supported by the chassis, and a box supported by the chassis spaced from the passenger compartment. The box including a lower bed fixedly mounted to the chassis, an upper bed, and a tail gate pivotally connected to the upper bed. Each of the upper bed, and the tail gate is shiftable relative to the lower bed.

20 Claims, 5 Drawing Sheets

TRUCK HAVING A DYNAMICALLY ADJUSTABLE BOX

INTRODUCTION

The subject disclosure relates to motor vehicles and, more particularly, to a truck having a dynamically adjustable box.

Pickup trucks include a box having a bed that it typically used to haul articles from one location to another. The length of the box varies depending on make and model of the vehicle. Many manufactures include several length options for each model. A long box allows a user to transport larger objects including sheets of plywood, lumber, and the like. However, the long box contributes to a larger turning radius and difficulty parking. Many parking spaces are not long enough to accommodate longer boxes.

Pickup trucks with shorter boxes are easier to manipulate and park but have a more limited carrying capacity. There are also mid-sized beds that have a larger turning radius and a nominal bed capacity. There are tradeoffs associated with each model. The shorter boxes are easier to park, turn, move through narrow locations such as drive-thru lanes but do not have the same storage capacity as the longer boxes. As such, often times articles in the smaller boxes hang outward from the vehicle and are prone to damage. Accordingly, it is desirable to provide a pickup truck having a box that may allow for easier turning and parking yet still provide storage capacity for longer items such as sheets of plywood, and pieces of lumber.

SUMMARY

Disclosed is a vehicle including a chassis, a passenger compartment supported by the chassis, and a box supported by the chassis spaced from the passenger compartment. The box including a lower bed fixedly mounted to the chassis, an upper bed, and a tail gate pivotally connected to the upper bed. Each of the upper bed, and the tail gate is shiftable relative to the lower bed.

In addition to one or more of the features described above or below, or as an alternative, further embodiments could include a bumper mechanically connected to the upper bed.

In addition to one or more of the features described above or below, or as an alternative, further embodiments could include a first drive system connected to the chassis, and a second drive system connected to the chassis and laterally spaced from the first drive system, the first drive system and the second drive system being connected to the upper bed.

In addition to one or more of the features described above or below, or as an alternative, further embodiments could include wherein the first drive system includes a cylinder fixedly connected to the chassis and a piston connected relative to the upper bed, the piston being moveable relative to the cylinder.

In addition to one or more of the features described above or below, or as an alternative, further embodiments could include a frame support connected to the piston.

In addition to one or more of the features described above or below, or as an alternative, further embodiments could include wherein the tail gate and the bumper are mechanically connected to the frame support.

In addition to one or more of the features described above or below, or as an alternative, further embodiments could include wherein the upper bed includes a first end supported on the lower bed and a second end supported by the frame support.

In addition to one or more of the features described above or below, or as an alternative, further embodiments could include a plurality of rollers arranged between the lower bed and the upper bed, the rollers promoting movement of the upper bed relative to the lower bed.

In addition to one or more of the features described above or below, or as an alternative, further embodiments could include wherein the lower bed includes a first end portion, a second end portion, and an intermediate portion, the first end portion being connected to the chassis through a first rail member and the second end portion being connected to the chassis through a second rail member.

In addition to one or more of the features described above or below, or as an alternative, further embodiments could include wherein the plurality of rollers are disposed on the intermediate portion of the lower bed.

In addition to one or more of the features described above or below, or as an alternative, further embodiments could include wherein the piston extends through second rail member and connects with the frame support.

In addition to one or more of the features described above or below, or as an alternative, further embodiments could include an adjustment system connected to the first drive system and the second drive system, the adjustment system selectively shifting the frame support relative to the chassis.

In addition to one or more of the features described above or below, or as an alternative, further embodiments could include wherein the adjustment system includes applies a force to the cylinder to move the piston and shift the frame support relative to the chassis.

In addition to one or more of the features described above or below, or as an alternative, further embodiments could include an actuator arranged in one of the passenger compartment and the box, the actuator commanding the adjustment system to activate the first drive system and the second drive system.

In addition to one or more of the features described above or below, or as an alternative, further embodiments could include a hitch receiver connected to the frame support.

Also disclosed is a method of configuring a box for a pickup truck including activating a control to shift an upper bed relative to a lower bed.

In addition to one or more of the features described above or below, or as an alternative, further embodiments could include shifting a tail gate with the upper bed.

In addition to one or more of the features described above or below, or as an alternative, further embodiments could include wherein shifting the upper bed includes extending a piston connected to the upper bed.

In addition to one or more of the features described above or below, or as an alternative, further embodiments could include wherein shifting the upper bed includes moving the upper bed upon rollers supported on the lower bed.

In addition to one or more of the features described above or below, or as an alternative, further embodiments could include wherein shifting the upper bed includes moving a hitch receiver relative to the lower bed.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1A:
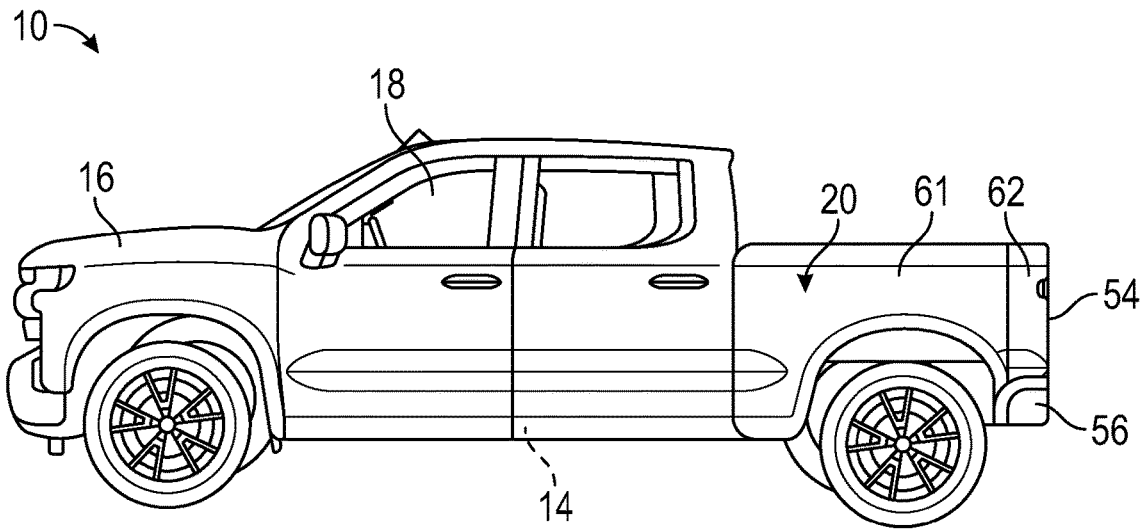
FIG. 1A is a side view of a pickup truck including a dynamically adjustable box in a retracted configuration, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1B:
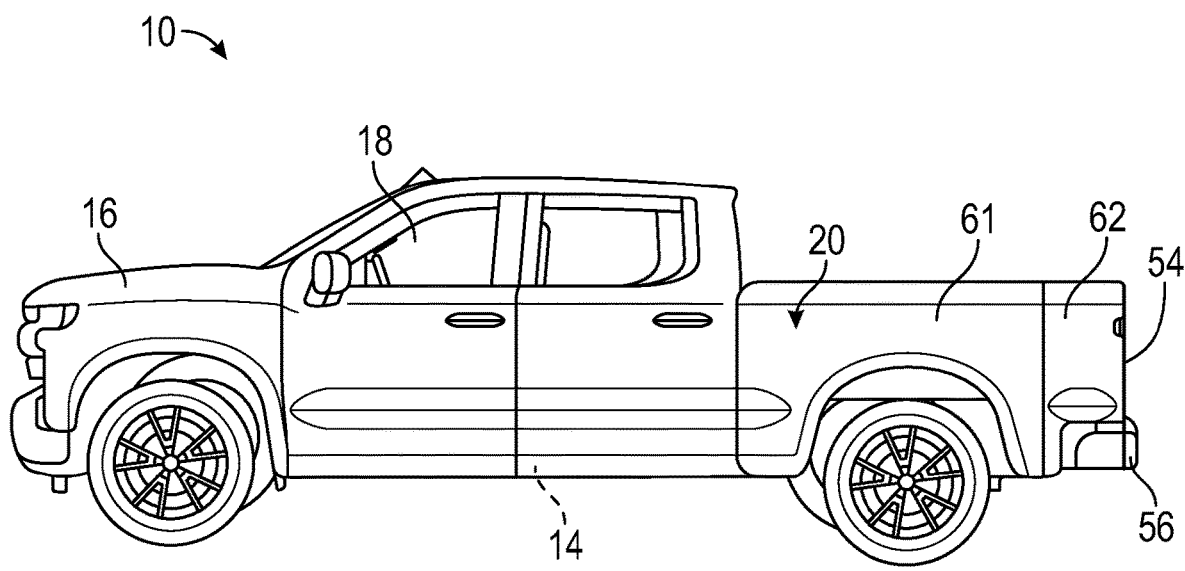
FIG. 1B is a side view of a pickup truck including a dynamically adjustable box in an extended configuration, in accordance with a non-limiting example.
Figure 2A:
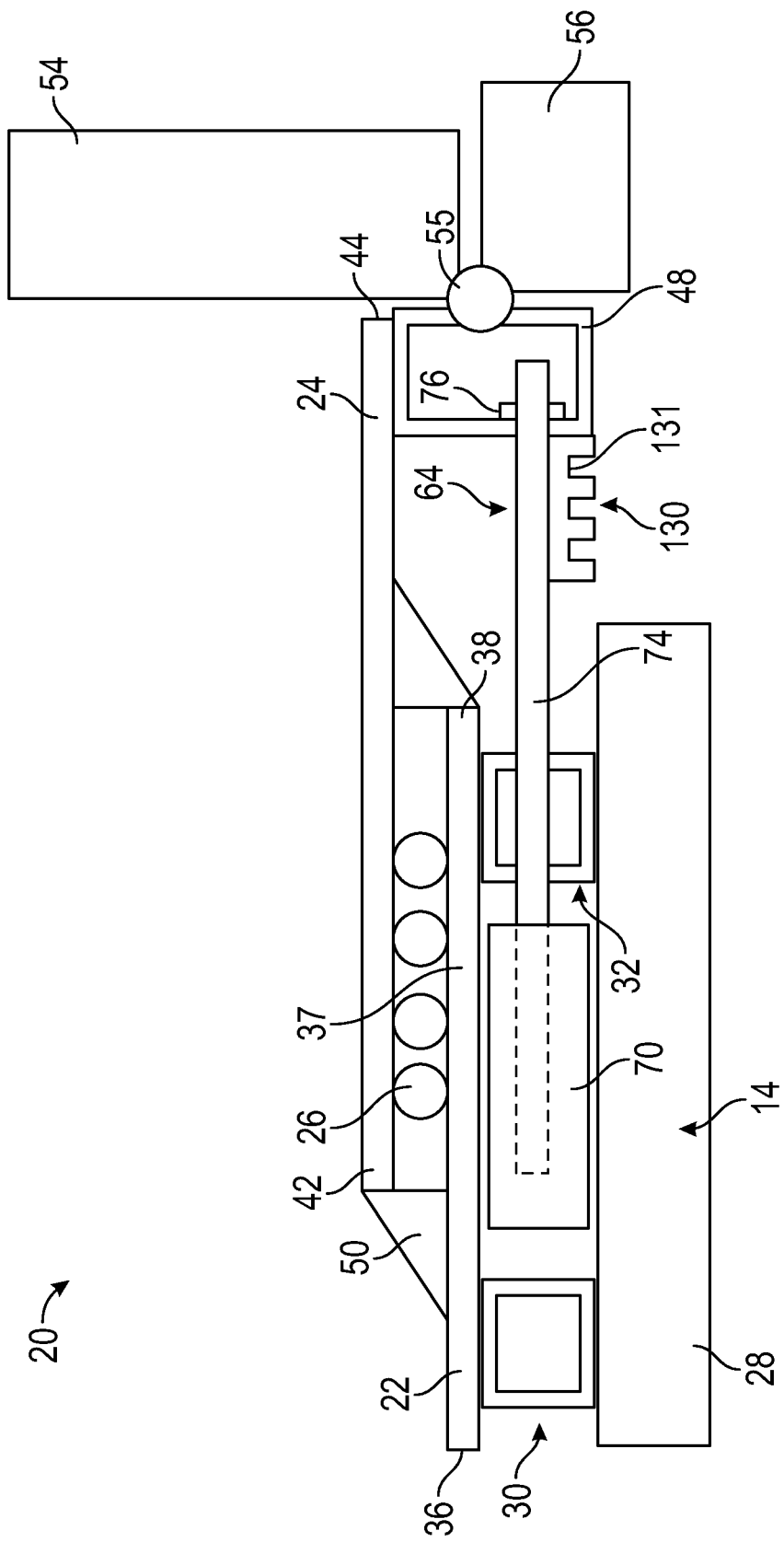
FIG. 2A is a schematic view of the dynamically adjustable bed of FIG. 1A, in accordance with a non-limiting example.
Figure 2B:
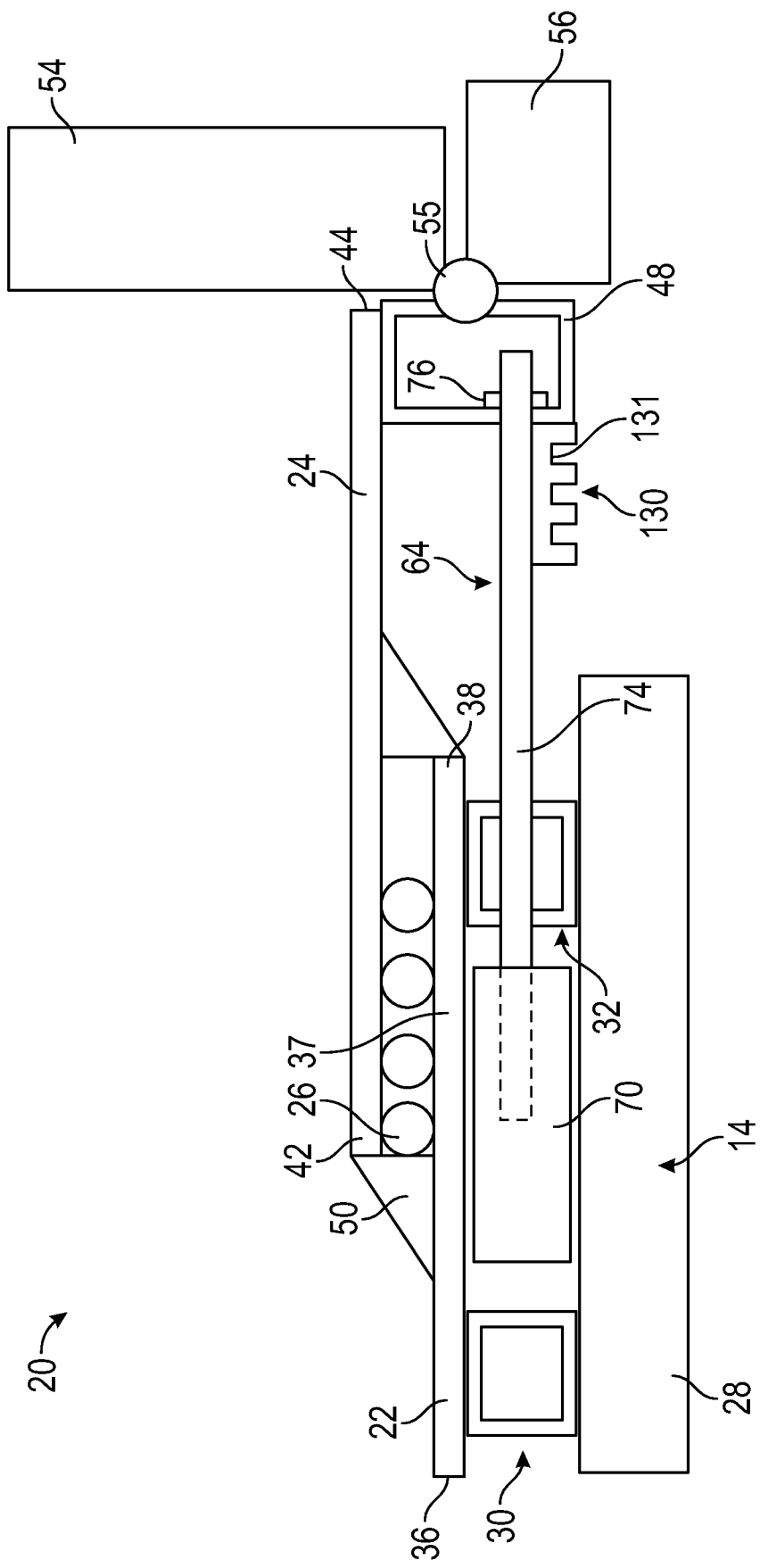
FIG. 2B is a schematic view of the dynamically adjustable bed of FIG. 1B, in accordance with a non-limiting example.
Figure 3A:
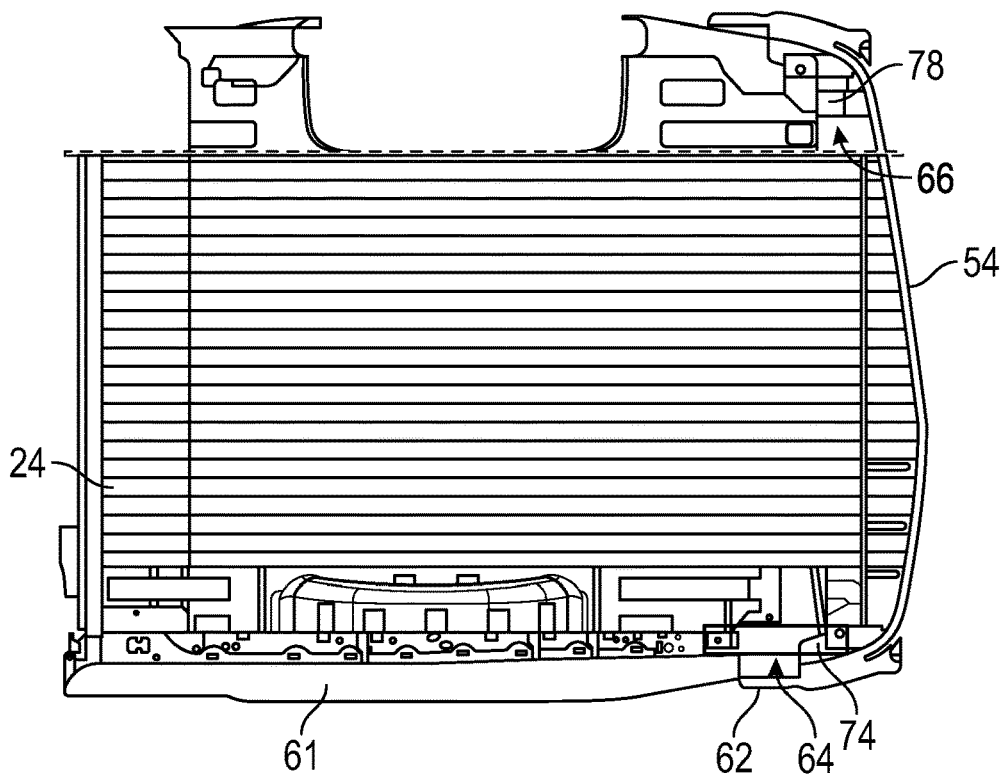
FIG. 3A is a top view of the dynamically adjustable box of FIG. 1A, in accordance with a non-limiting example.
Figure 3B:
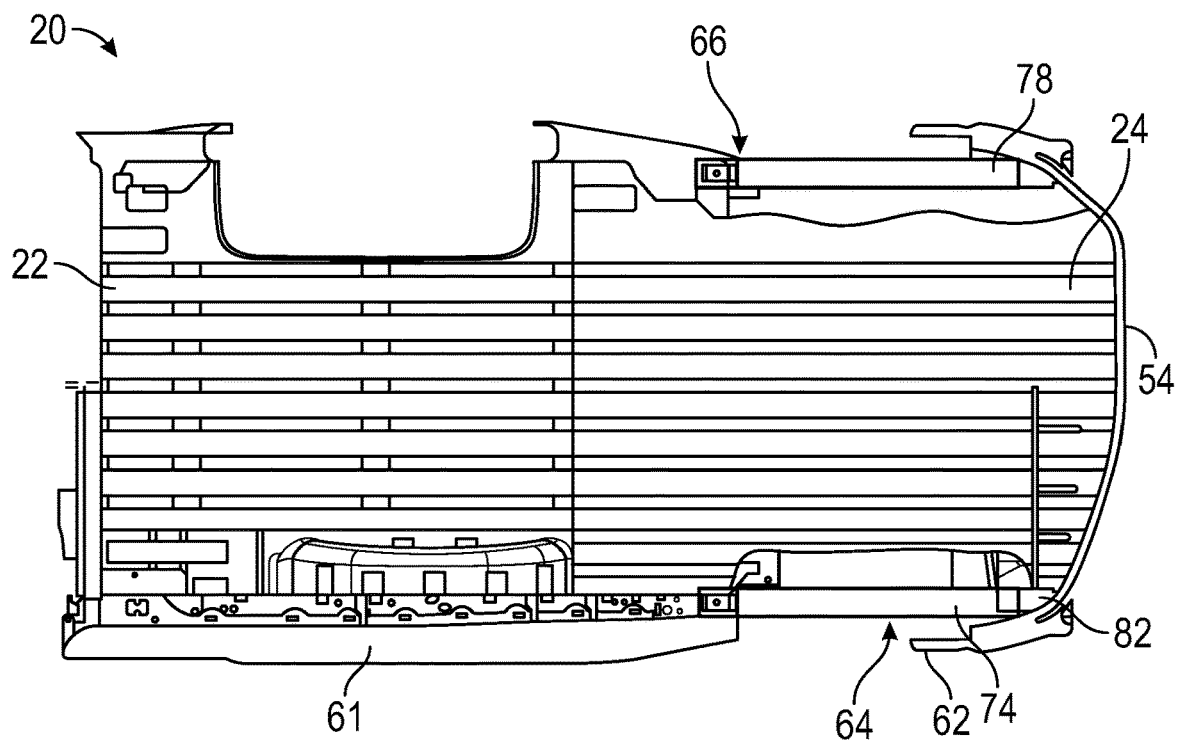
FIG. 3B is a top view of the dynamically adjustable bed of FIG. 1B, in accordance with a non-limiting example.

A vehicle in accordance with a non-limiting example is generally indicated at 10 in FIGS. 1A and 1B. Vehicle 10 takes the form a pickup truck. Pickup truck 10 includes a chassis 14 supporting a body 16 that defines a passenger compartment 18 and a dynamically adjustable box 20. As shown in FIGS. 2A and 2B, dynamically adjustable box 20 includes a lower, stationary bed 22 and an upper, moveable bed 24. A plurality of rollers 26 may be disposed between lower bed 22 and upper bed 24 to promote movement. Of course, it should be understood, that other structure, including sliders, extension rails, and the like may also promote movement of upper bed 24 relative to lower bed 22 in accordance with a non-limiting example.

Figure 4:
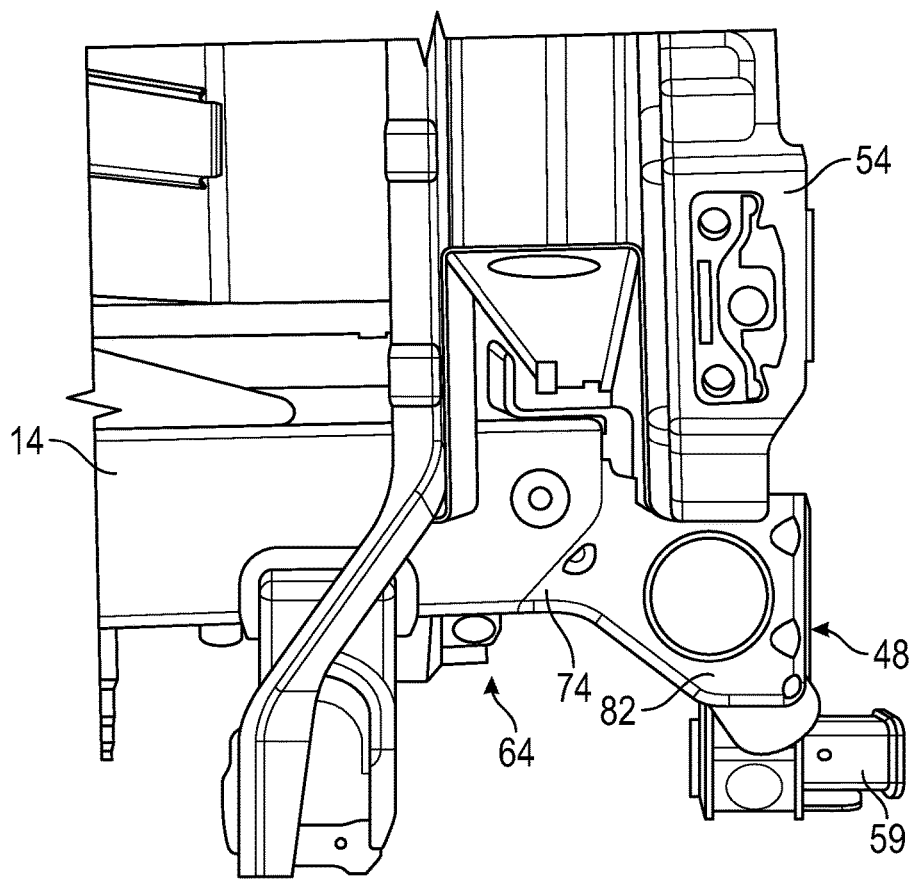
FIG. 4 is a detail view of portion of the dynamically adjustable bed showing a hitch receiver, in accordance with a non-limiting example.

Chassis 14 includes rails, one of which is indicated at 28, between which extend a first rail member 30 and a second rail member 32. Lower bed 22 includes a first end portion 36, an intermediate portion 37, and a second end portion 38. First rail member 30 may be positioned to support lower bed 22 adjacent to first end portion 36 while second rail member 32 is arranged to support second end portion 38 of lower bed 22. In a non-limiting example, upper bed 24 includes a first end 42 that is slidingly supported on lower bed 22 and a second end 44 that is supported by a frame support 48. A seal 50 may be disposed between first end 42 and lower bed 22. Seal 44 is positioned to prevent dirt or debris from entering between upper bed 24 and lower bed 22. Dynamically adjustable box 20 include a tail gate 54 having a hinge 55, and a bumper 56 connected to frame support 48. A hitch receiver 59 (FIG. 4) may also be coupled to frame support 48.

In a non-limiting example shown in FIGS. 1A and 1B, dynamically adjustable box 20 includes a first side panel 61 that is fixed relative to chassis 14, and a second side panel 62 that may extend with upper bed 24. A third side panel (not separately labeled) fixed to chassis 14 and a fourth side panel (also not separately labeled) moveable with upper bed 24 may also be provided. Dynamically adjustable box 20 may be extended by a first drive system 64 and a second drive system 66 as shown in FIGS. 2A/2B and 3A/3B.

First drive system 64 includes a chamber or cylinder 70 and a piston 74. Cylinder 70 is fixedly connected to chassis 14 and piston 74 is connected to frame support 48 and may be secured with a fastener 76. Second drive system 66 includes a chamber or cylinder (not shown) and a piston 78. Pistons 74 and 78 are selectively shifted to move upper bed 24 relative to lower bed 22. In accordance with a non-limiting example shown in FIG. 5, pickup truck 10 includes an adjustment system 104 which, when operated, applies a force to cylinder 70 to shift upper bed 24 relative to chassis 14 and lower bed 22 by selectively operating first drive system 64. Adjustment system 124 may likewise command second drive system 66. Adjustment system 104 includes an actuator 107 which operates first drive system 64 and second drive system 66 to selectively extend and retract piston 74 and piston 78 to move upper bed 24 to a selected position. At this point it should be understood that first drive system 64 and second drive system 66 may take on a variety of forms and should not be considered to be limited to the cylinder and piston arrangement shown. For example, first drive system 64 and second drive system 66 may employ a lead screw, a belt system, a chain system, a hydraulic system, a pneumatic system, and the like to move upper bed 24 relative to lower bed 22.

Figure 5:
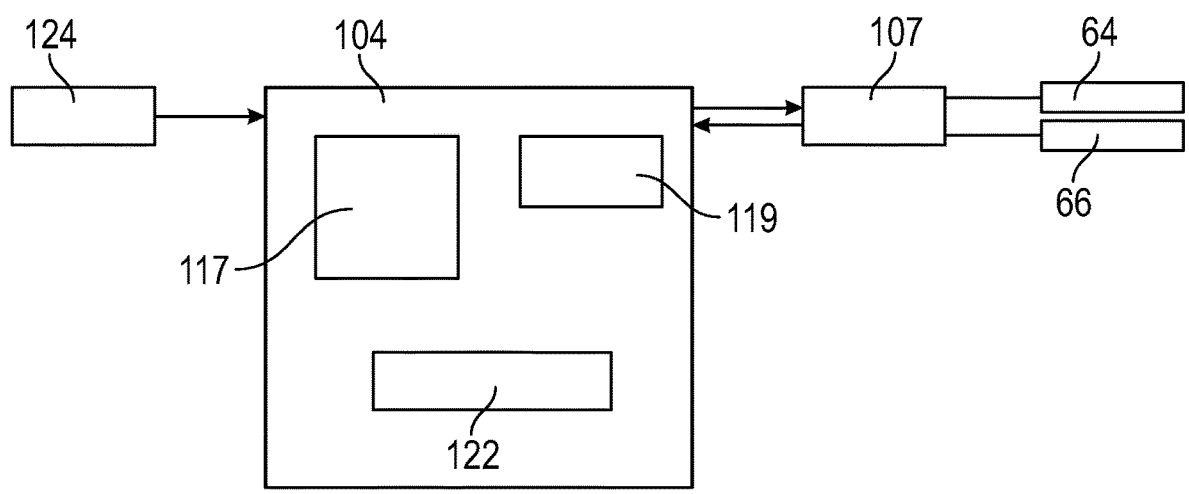
FIG. 5 is a block diagram depicting an adjustment system for the dynamically adjustable box, in accordance with a non-limiting example.

In further accordance with a non-limiting example shown in FIG. 5, adjustment system 104 includes a controller module 117, a control module 119, and a memory module 122 in the form of non-volatile memory. An adjustment system 124 is connected to adjustment system 104. Adjustment system 124 may be arranged in passenger compartment 18, at dynamically adjustable box 20 or may be part of a smart phone system. Adjustment system 124 allows a user to command first drive system 64 and second drive system 66 to shift upper bed 24 into one of multiple positions as set by, for example, a locking member 130 having multiple position stops 131. With this arrangement, a user can maintain the dynamically adjustable box 20 in a retracted position for everyday driving and, when more capacity is needed, extend upper bed 24 to a selected position. Memory module 122 allows the user to create and save pre-set positions for upper bed 24.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle comprising:
   a chassis;
   a passenger compartment supported by the chassis; and
   a box supported by the chassis spaced from the passenger compartment, the box comprising:
   a lower bed fixedly mounted to the chassis, the lower bed including a first side panel and a second side panel, the first side panel including a first terminal end and the second side panel including a second terminal end;
an upper bed including a third side panel and a fourth side panel, the third side panel including a third terminal end that selectively overlaps the first terminal end of the first side panel and the fourth side panel including a fourth terminal end that selectively overlaps the second terminal end of the second side panel; and
a tail gate pivotally connected to the upper bed between the third side panel and the fourth side panel, each of the upper bed, and the tail gate being shiftable relative to the lower bed.

2. The vehicle according to claim 1, further comprising: a bumper mechanically connected to the upper bed.

3. The vehicle according to claim 2, further comprising: a first drive system connected to the chassis, and a second drive system connected to the chassis and laterally spaced from the first drive system, the first drive system and the second drive system being connected to the upper bed.

4. The vehicle according to claim 3, wherein the first drive system includes a cylinder fixedly connected to the chassis and a piston connected relative to the upper bed, the piston being moveable relative to the cylinder.

5. The vehicle according to claim 4, further comprising a frame support connected to the piston.

6. The vehicle according to claim 5, wherein the tail gate and the bumper are mechanically connected to the frame support.

7. The vehicle according to claim 5, wherein the upper bed includes a first end supported on the lower bed and a second end supported by the frame support.

8. The vehicle according to claim 7, further comprising a plurality of rollers arranged between the lower bed and the upper bed, the rollers promoting movement of the upper bed relative to the lower bed.

9. The vehicle according to claim 8, wherein the lower bed includes a first end portion, a second end portion, and an intermediate portion, the first end portion being connected to the chassis through a first rail member and the second end portion being connected to the chassis through a second rail member.

10. The vehicle according to claim 9, wherein the plurality of rollers are disposed on the intermediate portion of the lower bed.

11. The vehicle according to claim 9, wherein the piston extends through the second rail member and connects with the frame support.

12. The vehicle according to claim 11, further comprising an adjustment system connected to the first drive system and the second drive system, the adjustment system selectively shifting the frame support relative to the chassis.

13. The vehicle according to claim 12, wherein the adjustment system includes applies a force to the cylinder to move the piston and shift the frame support relative to the chassis.

14. The vehicle according to claim 13, further comprising an actuator arranged in one of the passenger compartment and the box, the actuator commanding the adjustment system to activate the first drive system and the second drive system.

15. The vehicle according to claim 5, further comprising a hitch receiver connected to the frame support.

16. A method of configuring a box for a pickup truck comprising activating a control to shift an upper bed relative to a lower bed including a first end portion, a second end portion, and an intermediate portion, the first end portion being connected to the chassis through a first rail member and the second end portion being connected to the chassis through a second rail member, wherein activating the control commands a drive system to move a piston connected to the upper bed through the second rail member.

17. The method of claim 16, further comprising shifting a tail gate with the upper bed.

18. The method of claim 16, wherein shifting the upper bed includes moving the upper bed upon rollers supported on the lower bed.

19. The method of claim 16, wherein shifting the upper bed includes moving a hitch receiver relative to the lower bed.

20. The method of claim 16, wherein shifting the upper bed includes moving the upper bed to a pre-set position stored in a non-volatile memory of the control.

* * * * *